United States Patent [19]

Sakurai

[11] Patent Number: 5,195,002
[45] Date of Patent: Mar. 16, 1993

[54] APPARATUS FOR DRIVING INFORMATION RECORD MEDIUM

[75] Inventor: Yoshiki Sakurai, Tokyo, Japan

[73] Assignee: Kabushiki Kaisha Toshiba, Kawasaki, Japan

[21] Appl. No.: 722,139

[22] Filed: Jun. 27, 1991

[30] Foreign Application Priority Data

Jun. 29, 1990 [JP] Japan .................................. 2-173062

[51] Int. Cl.⁵ ............................................. G11B 17/02
[52] U.S. Cl. .................................................. 360/99.08
[58] Field of Search ................. 360/99.08, 98.07, 99.04

[56] References Cited

U.S. PATENT DOCUMENTS 4,658,312 4/1987 Elasser .
4,965,476 10/1990 Lin ........................... 360/99.08 X
5,038,240 8/1991 Isomura ......................... 360/99.08

Primary Examiner—A. J. Heinz
Attorney, Agent, or Firm—Cushman, Darby & Cushman

[57] ABSTRACT

A hard disk drive includes a housing which has a bottom wall and a cover facing each other. A stator for generating an alernating magnetic field is attached to the bottom wall. First and second bearings are provided on the stator and the cover, respectively, and a rotating shaft is rotatably supported by the bearings. A rotor formed of a magnetic material is fixed to the rotating shaft and has first and second surfaces facing the stator and the cover. A ring-shaped magnet is fixed to the first surface of the rotor to face the stator, and a magnetic disk is mounted on the second surface of the rotor.

18 Claims, 2 Drawing Sheets

APPARATUS FOR DRIVING INFORMATION RECORD MEDIUM

BACKGROUND OF THE INVENTION

1. Field of the Invention

The present invention relates to a compact drive apparatus for driving an information record medium, such as a hard disk drive.

2. Description of the Related Art

Conventionally, a data recording and reproducing apparatus, e.g., a hard disk drive (hereinafter referred to as HDD), is provided with a spindle motor as a drive mechanism for rotating a disk. It is generally known that a drive mechanism of a radial or axial type is used for this purpose.

An example of the axial-type drive mechanism is disclosed in U.S. Pat. No. 4,658,312. This mechanism comprises a rotating shaft, rotatably supported by a bearing tube through a pair of bearings, and a rotor casing fixed to the shaft. The disk is supported by means of the rotor casing. A coil serving as a stator is fixed to the outer circumferential surface of the bearing tube, and a ring-shaped magnet is fixed to the inner circumferential surface of the rotor casing. The coil and magnet extend in the axial direction of the rotating shaft. The magnet is situated outside the coil and faces thereto. The rotating shaft and the rotor casing are rotated by the interaction between the magnetic field generated by magnet and the current flowing the coil. In this case, the magnetic field acts on the coil in a direction perpendicular to the rotating shaft, i.e., in a direction parallel to the surface of the disk.

An radial-type drive mechanism comprises a ring-shaped magnet fixed to a rotating shaft, and a coil arranged to face the magnet. The magnet and the coil extend in a direction perpendicular to the rotating shaft, i.e., in a direction parallel to the surface of the disk. The magnetic field generated from the magnet acts on the coil in the axial direction of the shaft.

The miniaturization of HDDs has recently been accelerated, and disks of small diameters, e.g., 2.5 inches, have been coming into wide use. Accordingly, in order to miniaturize HDDs, it is required to miniaturize not only the disk and but also the disk drive mechanisms.

The HDDs may be miniaturized by two methods. According to one method, the radial length of the disk and the mechanism is curtailed to reduce the plane area thereof. According to the other method, the axial length of the mechanism is lessened to lower the profile thereof.

In the aforementioned axial-type drive mechanism, however, if the axial length of the rotating shaft is decreased in order to reduce the thickness of the HDD, the axial length of the coil and the magnet is also decreased. As a result, the area of the magnet facing the coil decreases and a necessary driving torque can not be obtained.

In the radial-type drive mechanism, if the radial length of the disk and the mechanism is reduced in order to decrease the plane area of the mechanism, the radial length of the coil and the magnet is also reduced. Thus, the area of the magnet facing the coil decreases and a necessary driving torque can not be obtained.

Due to the reason described above, the HDDs cannot be easily miniaturized or thinned.

SUMMARY OF THE INVENTION

The present invention has been contrived in consideration of these circumstances, and its object is to provide a record medium drive apparatus capable of being reduced in size and in thickness.

In order to achieve the above object, a drive apparatus according to the present invention comprises: a housing including first and second walls facing each other, the first wall; means attached to the first wall, for generating an alternating magnetic field; first and second bearings provided on the magnetic field generating means and the second wall, respectively; a rotating shaft having one end rotatably supported by the first bearing and the other end rotatably supported by the second bearing; supporting means fixed to the rotating shaft and having first and second surfaces facing the magnetic field generating means and the second wall, respectively, for supporting the record medium on the second surface, the supporting means being formed of a magnetic material; and a magnet fixed to the first surface of the supporting means so as to face the magnetic field generating means.

According to the drive apparatus constructed in this manner, the supporting means, which is formed of a magnetic material, doubles as a yoke, so that a yoke independent of the supporting means need not be provided between the supporting means and the magnet. Although the magnetic field generating means, such as exciting coils, and the magnet overlap one another with respect to the axial direction of the supporting means, therefore, the apparatus can enjoy a relatively low profile.

Since the opposite ends of the rotating shaft are supported individually on the first and second walls of the housing, moreover, a rotor cylinder independent of the housing, which is essential to the conventional apparatus, need not be provided in the housing. Thus, the apparatus can be further reduced in thickness.

Since no yoke independent of the supporting means is needed between the supporting means and the magnet, furthermore, the diameter of the magnet can be increased, so that a great driving torque can be produced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 and 2 show an HDD according to an embodiment of the present invention, in which:

FIG. 1 is a sectional view of the HDD, and

FIG. 2 is an exploded perspective view of a motor; and

DETAILED DESCRIPTION OF THE PREFERRED EMBODIMENTS

Preferred embodiments of the present invention will now be described in detail with reference to the accompanying drawings.

Figure 1:
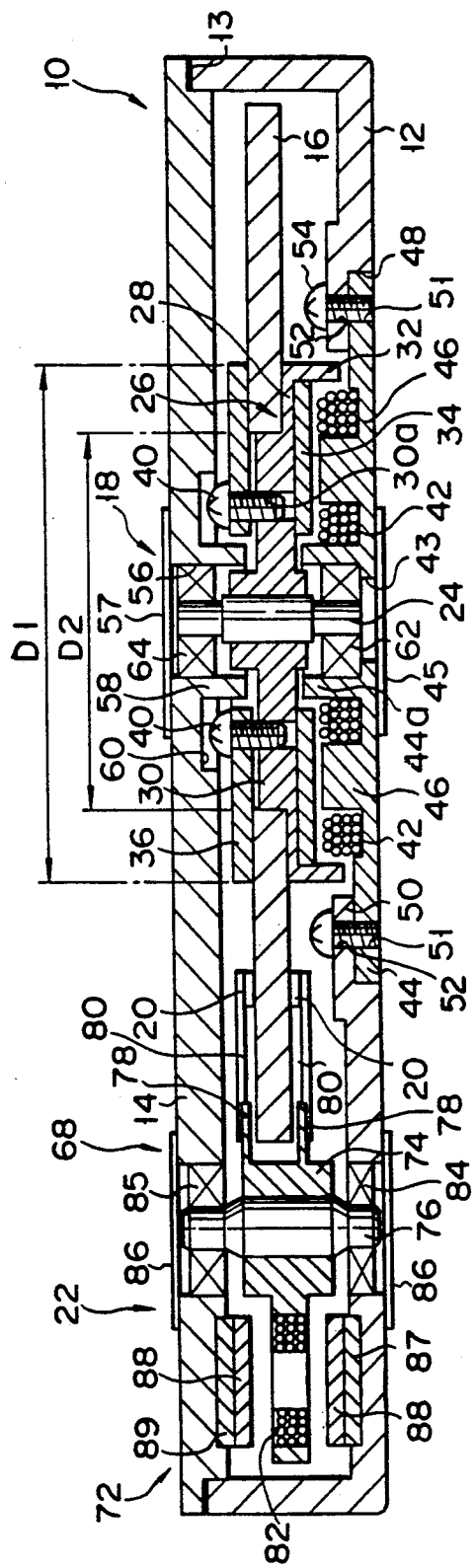

As shown in FIG. 1, an HDD according to an embodiment of the invention comprises a housing 10 in the form of a rectangular prism. The housing 10 includes a body and a rectangular cover 14. The housing body has a rectangular bottom wall 12 and side walls set up individually on side edges of the wall 12, and the cover 14 is removably fixed to the body through a gasket 13 as a sealing member and faces the bottom wall. Thus, the housing 10 is sealed air-tightly and prevents the entrance of dust and the like into the housing. The bottom wall 12 and the cover 14 constitute first and second walls, respectively, according to the present invention. Preferably, the housing 10, which is expected to be light in weight, should be formed of a nonmetallic material, such as a plastic material, or a light metal, such as aluminum. In order to electromagnetically shield the inside of the housing 10, the surface of the housing should be coated with an electrically conductive material.

The housing 10 contains therein a magnetic disk 16 for use as a record medium, a spindle motor 18 as a drive mechanism for rotating the disk, a pair of magnetic heads 20 for recording on and reproducing information from the disk, and a carriage device 22 used to support and drive the heads.

Figure 2:
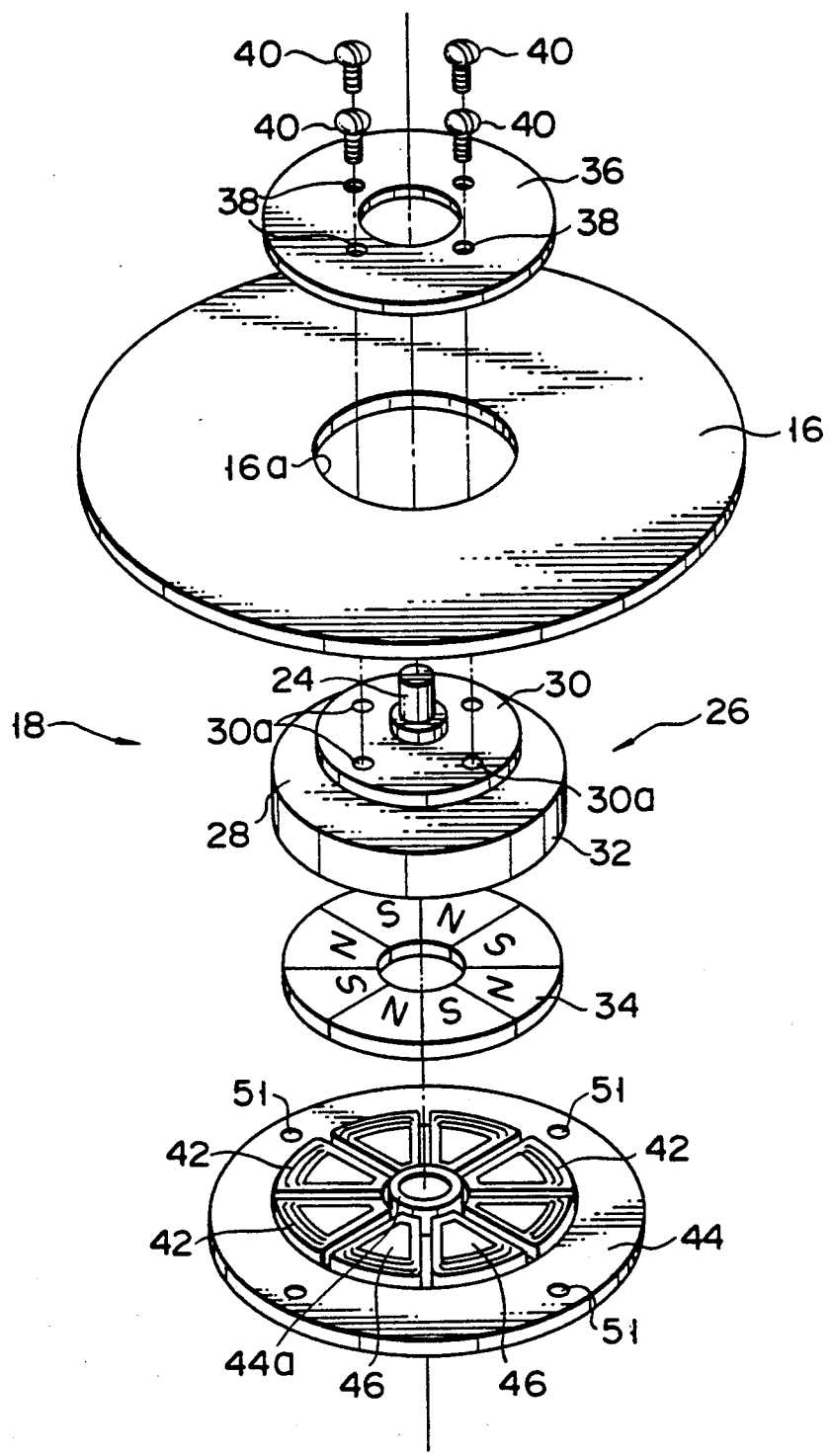

As shown in FIGS. 1 and 2, the motor 18, which is formed of a brushless DC motor of a sensorless type, comprises a rotating shaft 24 and a rotor 26 fixed to the shaft 24. In this sensorless motor, the angular position of the rotor is detected by detecting counter-electrmotive force which generates in a coil as a stator when the rotor along with a magnet rotates. The rotation of the rotor is controlled based on the detected angular position of the rotor. The control of the rotation is well known in the ordinary skilled in the art and, thus, the detailed description of a control circuit for the rotation control will be omitted.

The rotor 26 includes a disk-shaped body 28 having a diameter D1 and coaxial with the shaft 24, a cylindrical fitting portion 30 having a diameter D2 and protruding upward from the upper surface of the body 28, and a ring-shaped shield portion 32 protruding downward from the circumferential edge portion of the lower surface of the body 28. The rotor 26, which is formed of a magnetic material such as iron, doubles as a yoke for forming a magnetic path, and also as a hub on which the disk 16 is to be mounted. The fitting portion 30 has the circumferential direction.

The disk 16 used may be one having a small diameter of 1.8 or 2.5 inches. It has a center hole 16a, whose diameter is substantially equal to the diameter D2 of the fitting portion 30. The disk 16 is supported on the upper surface of the rotor 26 in a manner such that the fitting portion 30 is fitted in the center hole 16a. Moreover, the disk 16 is clamped by means of the rotor 26 and a ring-shaped clamp plate 36 fixed thereto. The clamp plate 36 has an outer diameter equal to the diameter D1 of the rotor 26 and an inner diameter smaller than that of the center hole 16a of the disk 16. The plate 36 has four through holes 38 arranged at regular intervals in the circumferential direction. In this arrangement, the clamp plate 36 is fixed to the rotor 26 by means of screws 40 which are screwed individually into the tapped holes 30a of the rotor through the holes 38.

A ring-shaped magnet 34 is fixed to the lower surface of the rotor 26 so as to be coaxial therewith. The magnet 34 has an outer diameter greater than the diameter of the center hole 16a of the disk 16, and its outer circumferential edge engages the inner circumferential surface of the shield portion 32. The inner diameter of the magnet 34 is substantially equal to that of the clamp plate 36. Further, the magnet 34 is magnetized so as to have north and south poles alternately arranged in the circumferential direction thereof.

The motor 18 comprises six exciting coils 42 which, in conjunction with the magnet 34, cause the rotor 26 to rotate. The coils 42 are fixed to a circular support plate 44. The coils 42 and the support plate 44 constitute a stator of the motor 18. A through hoe 43 is bored through the central portion of the plate 44, and a cylindrical projection 44a is formed along the edge of the hole 43. Six pole pieces 46, which protrude from the support plate 44, are arranged at regular intervals in the circumferential direction so as to surround the projection 44a. The support plate 44, along with the pole pieces 46, are integrally formed of a magnetic material. Each coil 42 is fixed to the plate 44 while being wound around its corresponding pole piece 46. The support plate 44 has four tapped holes 51 arranged at regular intervals in the circumferential direction.

The coils 42 are alternately excited by means of a drive circuit (not shown), thereby generating an alternating magnetic field. The coils 43 and the support plate 44 constitute magnetic field generating means. The drive circuit (not shown) is mounted on a printed circuit board (not shown) which is attached to the outside of the housing 10 and connected to the coils 42 through a flexible cable. In this case, the cable is led out of the housing through a hole bored in the bottom wall 12 or the support plate 44 and is connected to the circuit board. The hole is filled and closed by an epoxy resin so that dust and the like does not enter the housing through the hole.

The support plate 44 is fixed to the bottom wall 12 of the housing 10. More specifically, a circular opening 48 is formed in the wall 12, and a ring-shaped flange 50 protrudes from the inner surface of the wall 12 toward the opening 48. The flange 50 has four through holes 52 arranged at regular intervals in the circumferential direction. The support plate 44 is fixed to the bottom wall 12 by means of screws 54 screwed individually into the tapped holes 51 through the holes 52 in a manner such that the plate 44 is fitted in the opening 48. In this fixed state, the support plate 44 is situated flush with the bottom wall 12. The through hole 43 of the plate 44 is closed by means of a sealing member, e.g., an aluminum leaf 45, pasted on the bottom surface of the plate 44, whereby dust or the like is prevented from entering the housing 10 through the hole 43.

As shown in FIG. 1, the cover 14 of the housing 10 has a through hole 56 and a cylindrical projection 58 which protrudes from the peripheral edge of the hole 56 toward the bottom wall 12. The projection 58 is coaxial with and has the same diameter as the projection 44a of the support plate 44. The through hole 56 is closed by means of a sealing member, e.g., an aluminum leaf 57, pasted on the surface of the cover 14, whereby dust or the like is prevented from entering the housing 10 through the hole 56. Also, an annular groove 60 is formed in the inner surface of the cover 14 so as to surround the projection 58. The groove 60 provides a space for receiving the respective heads of the screws 40 which are used to fix the clamp plate 36.

A first bearing 62 is fitted in the projection 44a of the support plate 44, and a second bearing 64 in the projection 58 of the cover 14. The lower and upper ends of the rotating shaft 24, which protrude from the rotor 26, are rotatably supported by the first and second bearings 62 and 64, that is, by the support plate 44 and the cover 14, respectively.

When the motor 18 is set in the housing 10 in this manner, the upper and lower surfaces of the rotor 26 are opposed to the cover 14 and the support plate 44, respectively. The magnet 34 oppositely adjoins the coils 42. The ring-shaped shield portion 32 is situated outside the coils 42, and its lower end face is opposed close to the support plate 44. The shield portion 32 has a magnetic shielding effect such that magnetic flux generated by the magnet 34 and the coils 42 exerts no bad influence upon the magnetic heads 20. In order to obtain a satisfactory shielding effect, the distance between the lower end face of the shield portion 32 and the support plate 44 should preferably be adjusted to 1 mm or less.

The projection 44a of the support plate 44 extends close to the rotor 26 through the inner bore of the magnet 34. The projection 58 of the cover 14 extends close to the rotor 26 through the inner bore of the clamp plate 36. The gaps between the distal end face of the projection 44a and the lower face of the rotor 26 and between the distal end face of the projection 58 and the upper surface of the rotor 26 constitute labyrinth seals, individually. These seals prevent grease, scattered from the bearings 62 and 64, from entering the housing 10. Preferably, these gaps have a width of 0.5 mm or less.

The paired magnetic heads 20, which face each other with the disk 16 between them, are supported by a carriage 68 of the carriage device 22. The carriage 68 is rotated relatively to the disk 16 by means of a voice coil motor 72.

The carriage 68 includes a body 74 fixed to a rotating shaft 76 and having a pair of arms 78 extending toward the disk 16. The magnetic heads 20 are supported by the arms 78 through suspensions 80 formed of leaf springs, respectively. A coil 82 is mounted on the body 74 and located on the side of the shaft 76 opposite to the arm 78. The upper and lower ends of the rotating shaft 76 are rotatably supported by third and fourth bearings 84, 85. The bearing 84 is fitted in a hole bored in the bottom wall 12, and the bearing 85 is fitted in a hole bored in the cover 14. These holes are closed by aluminum leafs 86.

The voice coil motor 72 includes first and second yokes 87, 89 fixed to the inner surfaces of the bottom wall 12 and the cover 14, respectively. Magnets 88 are fixed to the yokes 87 and 89 to face each other, and the coil 82 is located between the magnets. The carriage 68 is rotated in accordance with the direction and amount of current applied to the coil 82 of the motor 72. A carriage drive circuit (not shown) is mounted on the above-mentioned circuit board and connected to the coil 82 through the above-mentioned flexible cable. Further, a read/write circuit for controlling the recording and reproducing operations of the magnetic head 20 is mounted on the printed circuit board and connected to the heads through a flexible cable (not shown) passing a through hole bored in the bottom wall 12. The through hole is closed by a sealing member such as an epoxy resin.

When the exciting coils 42 are energized, a rotatory force is produced in the rotor 26 by the electromagnetic action of the coils and the magnet 34. As a result, the rotor 26 is rotated together with the disk 16 mounted thereon. The magnetic head 20 is driven by means of the voice coil motor 72 to seek a desired track on the disk 16 and execute recording or reproducing of information on the track. Thereafter, date recording/reproducing operation is performed by the magnetic heads 20 with respect to a desired track of the disk 16.

According to the HDD constructed in this manner, the rotor 26, which is formed of a magnetic material, serves also as the yoke of the motor 18 and the hub for supporting the disk 16, so that a separate yoke need not be provided between the rotor and the magnet 34. Accordingly, the motor 18 and the housing 10 can enjoy a relatively low profile.

The first and second bearings 62 and 64, which support the opposite ends of the rotating shaft 24, are fixed to the support plate 44, which is flush with the bottom wall 12 of the housing 10, and the cover 14 of the housing, respectively. Thus, the housing can be further reduced in thickness. In this embodiment, the thickness of the housing 10 may be 10 mm or thereabout.

Further, the diameter of the magnet can be made greater than the diameter D2 of the center hole 16a of the disk 16, so that the area of the magnet 34 which faces the coil 42 is increased. Thus, a great driving torque can be produced.

Since the rotor 26 is provided with the shield portion 32, it can prevent leakage of the magnetic flux generated by the magnet 34 and the coils 42, although it is formed of a magnetic material. Thus, the magnetic heads 20 cannot be adversely affected by the magnetic flux.

Figure 3:
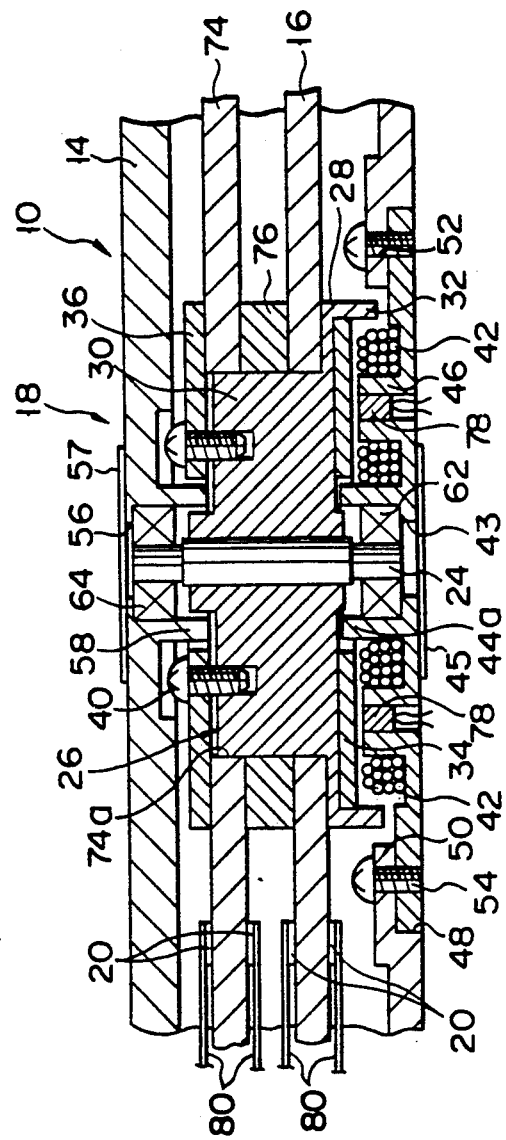
FIG. 3 is a sectional view showing the principal part of an HDD according to another embodiment of the invention.

FIG. 3 shows the principal part of an HDD according to a second embodiment of the present invention.

According to this embodiment, a rotor 26 is fitted with a magnetic disk 74 as well as a disk 16. The disk 74 has the same size as the disk 16, and is mounted on the rotor 26 in a manner such that a fitting portion 30 of the rotor 26 is fitted in its center hole 74a. A ring-shaped spacer 76 is fitted on the fitting portion 30 and interposed between the disks 16 and 74. Additionally provided on the carriage 68 are another pair of magnetic heads for recording on and retrieving information from the disk 74.

In this embodiment, a hole is bored in each of pole pieces 46 of a support plate 44 and a Hall element 78 for detecting the angular position of the rotor 26 is fitted in the hole. Each hole is closed by a sealing member such as epoxy resin. The element 7 detects magnetic flux and inputs signal through a lead wire in a motor drive circuit (not shown). This circuit is mounted on a printed circuit board (not shown) arranged outside the housing 10. The drive circuit detects the angular position of the rotor 26 of the motor 18, base on the signal from the Hall elements 78, and controls the rotation of the motor by using the detected angular position.

For the other elements, the second embodiment is arranged in the same manner as the first embodiment, so that like reference numerals are used to designate like portions throughout the drawings for simplicity of illustration, and a detailed description of those portions is omitted.

Also according to the second embodiment constructed in this manner, the apparatus can enjoy a low profile and a satisfactory driving torque.

It is to be understood that the present invention is not limited to the embodiments described above, and that various changes and modifications may be effected therein by one skilled in the art without departing from the scope or spirit of the invention.

For example, the support plate 44 may be fixed to the upper surface of the bottom wall of the housing without forming the opening 48 therein. Also in this case, the apparatus can be low enough in profile.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for driving a disk-shaped record medium, comprising:
    a housing including first and second walls facing each other;
    means attached to the first wall, for generating an alternating magnetic field;
    first and second bearings provided on the generating means and the second wall, respectively;
    a rotating shaft having one end rotatably supported by the first bearing and the other end rotatably supported by the second bearing;
    supporting means fixed to the rotating shaft and having first and second surfaces facing the generating means and the second wall, respectively, for supporting the record medium on the second surface, the supporting means being formed of a magnetic material; and
    a magnet fixed to the first surface of the supporting means so as to face the generating means.

2. An apparatus according to claim 1, wherein said generating means includes a support plate, formed of a magnetic material and fixed to the first wall, and a plurality of exciting coils fixed to the support plate so as to face the magnet.

3. An apparatus according to claim 2, wherein said first wall has an opening, and said support plate is fixed to the first wall while being fitted in the opening.

4. An apparatus according to claim 2, wherein said first bearing is fixed to the support plate, said support plate has a plurality of pole pieces protruding toward the magnet and located at intervals in the circumferential direction so as to surround the first bearing, and each of said coils is wound on each corresponding pole piece.

5. An apparatus according to claim 4, which further comprises detecting means arranged in the pole pieces, for detecting an angular position of the supporting means.

6. An apparatus according to claim 1, wherein said supporting means includes a ring-shaped shield portion protruding from the first surface toward the generating means and shielding a magnetic field generated by the generating means and the magnet.

7. An apparatus according to claim 6, wherein said magnet is in the form of a ring having an outer diameter substantially equal to an inner diameter of the shield portion, and is situated inside the shield portion.

8. An apparatus according to claim 7, wherein said generating means includes a support plate, formed of a magnetic material and fixed to the first wall, and a plurality of exciting coils fixed to the support plate so as to face the magnet, said coils being situated inside the shield portion.

9. An apparatus according to claim 8, wherein said support plate includes a cylindrical projection protruding toward the supporting means and coaxial with the rotating shaft, and said first bearing is fixed in the projection.

10. An apparatus according to claim 9, wherein said first projection has a distal end face oppositely adjoining the first surface of the supporting means, said distal end face, in conjunction with the first surface, constituting a labyrinth seal.

11. An apparatus according to claim 8, wherein said second wall includes a cylindrical second projection protruding toward the supporting means and coaxial with the rotating shaft, and said bearing is fixed in the projection.

12. An apparatus according to claim 11, wherein said projection has a distal end face oppositely adjoining the second surface of the rotor, said distal end face, in conjunction with the second surface, constituting a labyrinth seal.

13. An apparatus according to claim 1, wherein said disk has a center hole, and said supporting means is formed in a disk-shape with an outer diameter greater than the diameter of the center hole of the disk, and includes a circular projection protruding from the second surface and fitted in the center hole.

14. An apparatus according to claim 13, wherein said magnet is in the form of a ring having an outer diameter greater than the diameter of the center hole of the disk.

15. An apparatus according to claim 13, which further comprises means for retaining the disk on the supporting means.

16. An apparatus according to claim 15, wherein said retaining means includes a clamp plate fixed to the supporting means and clamping the disk in cooperation with the supporting means, said clamp plate being in the form of a ring having an outside diameter substantially equal to the diameter of the supporting means and an inside diameter smaller than the diameter of the center hole of the disk.

17. A drive apparatus for driving a disk-shaped record medium having a center hole, comprising:
    a housing including first and second walls facing each other;
    means attached to the first wall, for generating an alternating magnetic field,
    first and second bearings provided on the generating means and the second wall, respectively;
    a rotating shaft having one end rotatably supported by the first bearing and the other end rotatably supported by the second bearing;
    supporting means fixed to the rotating shaft and having first and second surfaces facing the generating means and the second wall, respectively, for supporting the record medium on the second surface, the supporting means being formed of a magnetic material; and
    a magnet fixed to the first surface of the supporting means so as to face the generating means, said magnet having an outer diameter greater than the diameter of the center hole of the disk.

18. A hard disk drive comprising:
    a housing including first and second walls facing each other;

means attached to the first wall, for generating an alternating magnetic field;

first and second bearings provided on the generating means and the second wall, respectively;

a rotating shaft having one end rotatably supported by means of the first bearing and the other end rotatably supported by means of the second bearing;

supporting means fixed to the rotating shaft and having first and second surfaces facing the generating means and the second wall, respectively, for supporting a magnetic disk on the second surface, the supporting means being formed of a magnetic material;

a magnet fixed to the first surface of the supporting means to face the generating means;

head means for recording on and retrieving information from the magnetic disk; and means arranged in the housing, for moving the head means with respect to the magnetic disk.

* * * * *